United States Patent
Losser et al.

(10) Patent No.: US 6,813,480 B2
(45) Date of Patent: Nov. 2, 2004

(54) VOLTAGE CONTROLLED ATTENUATOR FOR MULTI-BAND AND MULTI-MODE TRANSMITTER AND METHOD THEREOF

(75) Inventors: Daniel Eric Losser, Grayslake, IL (US); Arul Balasubramaniyan, Round Lake, IL (US); Dan Nobbe, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 608 days.

(21) Appl. No.: 09/956,216

(22) Filed: Sep. 19, 2001

(65) Prior Publication Data

US 2003/0054779 A1 Mar. 20, 2003

(51) Int. Cl.[7] .................................... H04Q 1/04
(52) U.S. Cl. .................. 455/127.1; 455/552.1; 455/553.1
(58) Field of Search ................. 455/127, 552, 455/567, 553.1, 168.1; 330/252, 261, 277, 278; 333/81 R

(56) References Cited

U.S. PATENT DOCUMENTS

| | | | |
|---|---|---|---|
| 5,802,452 A | 9/1998 | Grandfield et al. | |
| 5,862,460 A | 1/1999 | Rich | |
| 5,995,853 A | * 11/1999 | Park | 455/574 |
| 6,038,428 A | * 3/2000 | Mizusawa et al. | 455/69 |
| 6,226,114 B1 | 5/2001 | Ashkeboussi et al. | |

* cited by examiner

*Primary Examiner*—Melur Ramakrishnaiah
(74) *Attorney, Agent, or Firm*—Shigeharu Furukawa

(57) ABSTRACT

The present invention describes a voltage controlled attenuator (VCA) to control an output power level of a radio frequency (RF) signal and to direct the RF signal to an appropriate path for a multi-mode and multi-band radiotelephone without using an external switch and without using multiple common VCAs. The present invention comprises a single differential amplifier and a plurality of steering blocks with each of steering blocks having a path dedicated to a specific RF band and a specific RF mode, having a pair of steering lines to control the RF signal level by having a differential voltage applied, and being capable of being disabled by having its steering lines grounded.

11 Claims, 2 Drawing Sheets

VOLTAGE CONTROLLED ATTENUATOR FOR MULTI-BAND AND MULTI-MODE TRANSMITTER AND METHOD THEREOF

FIELD OF THE INVENTION

The present invention relates generally to the field of radio communications. More specifically, the present invention relates to a transmitter architecture utilizing a voltage controlled attenuator to control its transmission signal level.

BACKGROUND OF THE INVENTION

A new generation of radiotelephones is expected to be more capable and more efficient than a previous generation of radiotelephones. Such new radiotelephone may be expected to allow a user to operate in multiple systems that were traditionally incompatible such as time-division-multiple-access (TDMA), global system for mobile (GSM), and code-division-multiple-access (CDMA), while providing a longer talk time without increasing in size. In order to support multiple systems, the radiotelephone is likely to be required to support multiple radio frequency (RF) bands such as 800 MHz, 900 MHz, 1800 MHz, and 1900 MHz.

A voltage controlled attenuator (VCA) is an essential part of today's transmitter architecture providing a strict control of a transmission signal level required by the systems. A common differential VCA 100 consists of a differential amplifier 102 and a steering block 104 as illustrated in FIG. 1. The signal level at the output 106 and 108 of the VCA is varied by applying a differential control voltage ($V_c$) to the steering lines 110 and 112 which are connected to the bases of transistor pair 114 and 116, and to the bases of transistor pair 118 and 120, respectively. The control voltage steers the current flow between 114 and 118, and between 116 and 120. For a maximum output power, a maximum differential control voltage is applied to the steering lines 110 and 112 with the line 110 having a lower voltage and the line 112 having a higher voltage relative to each other respect to a circuit ground. All of the current available from the power supply line 130 flows through loads 122 and 124, and a differential RF input signal present on lines 126 and 128 is amplified. For a minimum power, a maximum differential control voltage is applied to the steering lines 110 and 112 with the line 110 having a higher voltage and the line 112 having a lower voltage relative to each other respect to a circuit ground. The current available from the power supply line 130 is allowed to flows through transistor pair 114 and 116 thereby reducing the current flow through loads 122 and 124 and attenuating the differential RF input signal.

In order to support multiple bands, today's common transmitter architecture employed in a radiotelephone uses a VCA followed by an external switch to select one of the multiple bands, or uses multiple VCAs dedicating one VCA for each band as illustrated. However, each of these methods has disadvantages.

The external switch method requires an additional component, namely a separate switch device. Because of system requirements for high linearity for high power signal, the switch device must achieve high linearity requiring large current drain, and the signal going through the switch device experiences some loss which degrades the signal quality. The through-loss of the switch device must be compensated with a higher gain, which requires more current drain, somewhere in the transmitter lineup in order to achieve a desired power output. The external switch device also requires an additional space on the radiotelephone printed circuit board making the radiotelephone larger.

The multiple VCA method does not degrade the signal quality. However, integrating multiple VCA circuits into a single device increases the die size of the device and increases parts required to support such circuits.

Accordingly, there is a need to control an output power level of a radio frequency (RF) signal and to direct the RF signal to an appropriate path for a multi-mode and multi-band radiotelephone without using an external switch and without using multiple common VCAs.

SUMMARY OF THE INVENTION

The present invention describes a voltage controlled attenuator (VCA) to control an output power level of a radio frequency (RF) signal and to direct the RF signal to an appropriate path for a multi-mode and multi-band radiotelephone without using an external switch and without using multiple common VCAs.

The present invention comprises of a differential amplifier and a plurality of steering blocks, each of which is coupled to a path dedicated to a specific RF band and a specific RF mode and has two steering lines for applying a differential voltage. Only one steering block out of the plurality of steering blocks is activated at a time, and the RF signal entering the differential amplifier is directed to the activated steering block. This activation is achieved by applying a differential voltage to the steering lines of the steering block to be activated while grounding the steering lines of the other steering blocks.

By repeating only the steering block circuits of a VCA for multi-mode and multi-band use, the overall size, current consumption, and complexity of the VCA is reduced.

DETAILED DESCRIPTION OF A PREFERRED EMDODIMENT

Figure 1:
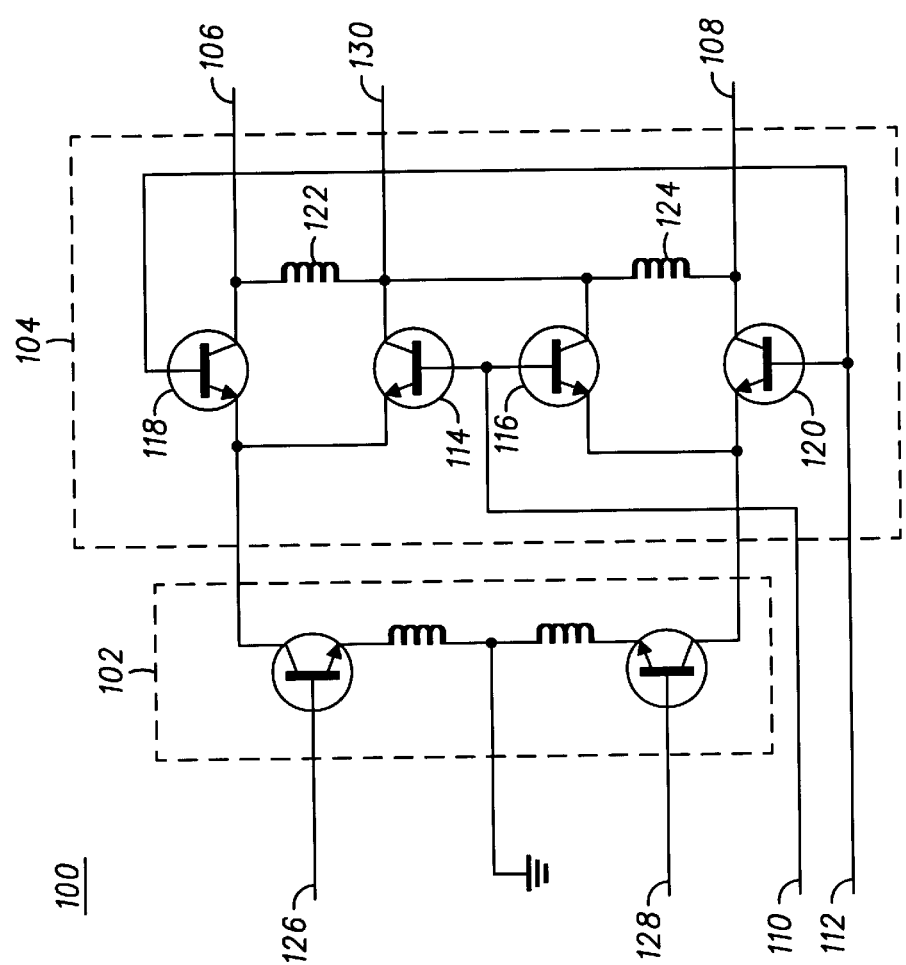
FIG. 1 is a block diagram of a voltage controlled attenuator (VCA) comprising a differential amplifier and a steering block of the prior art.
Figure 2:
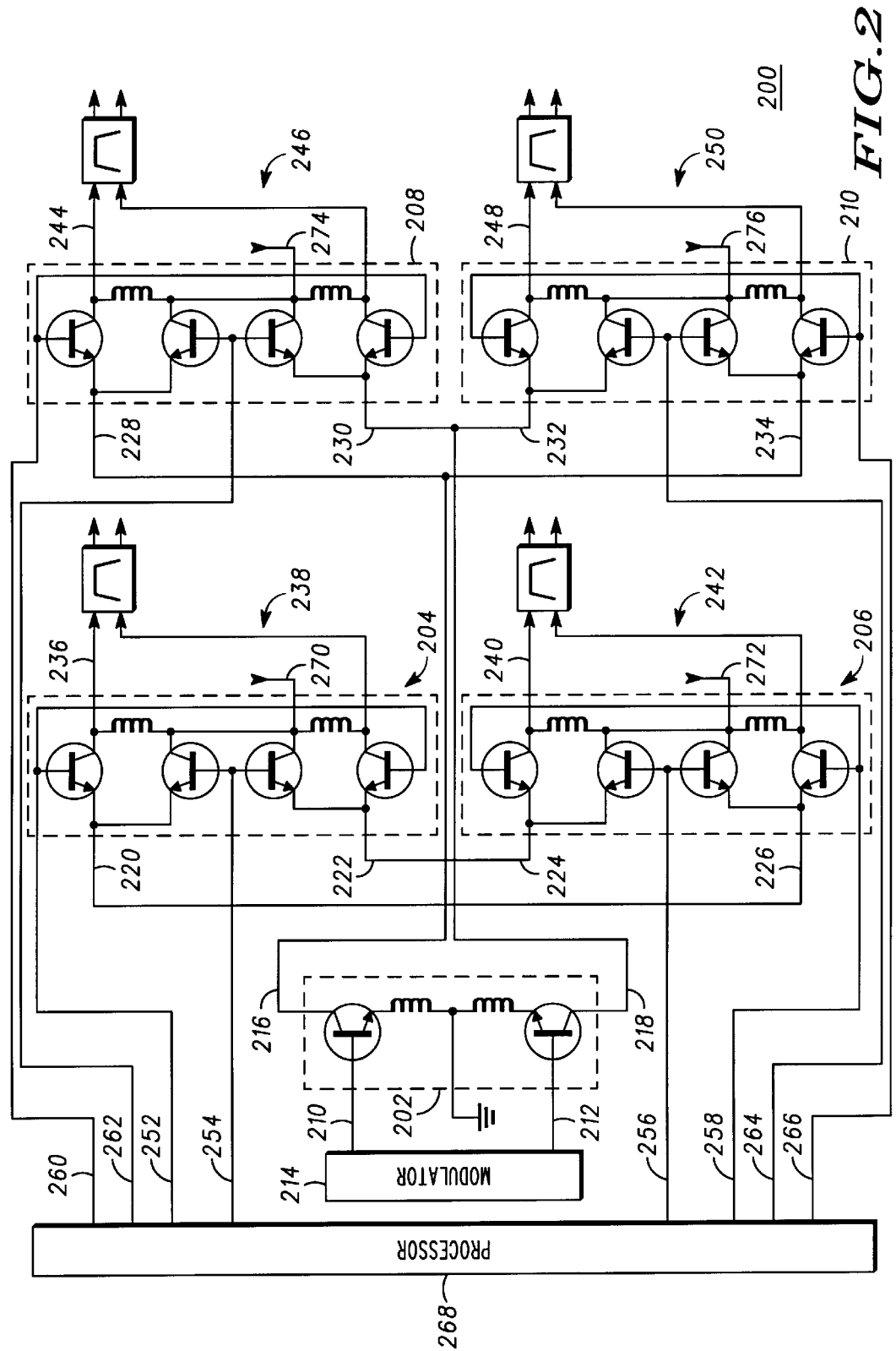
FIG. 2 is a block diagram of a preferred embodiment of the present invention.

A preferred embodiment 200 of the present invention to control magnitude and path of a differential radio frequency (RF) signal is illustrated in FIG. 2, comprising a single differential amplifier 202, and four steering blocks 204, 206, 208, and 210 as an example of a plurality of steering blocks accompanying the single differential amplifier. The differential amplifier 202 has a pair of inputs 210 and 212 to receive a differential RF signal from a modulator 214, such as from a modulator of a radio communication device for example, and has a pair of outputs 216 and 218. Each of the steering blocks has a pair of inputs, inputs 220 and 222 for steering block 204, inputs 224 and 226 for steering block 206, inputs 228 and 230 for steering block 208, and inputs 232 and 234 for steering block 210, which are all coupled to the pair of outputs 216 and 218 of the differential amplifier 202 to receive an amplified differential RF signal. Each of the steering blocks has a pair of outputs, outputs 236 and 238 for steering block 204, outputs 240 and 242 for steering block 206, outputs 244 and 246 for steering block 208, and outputs 248 and 250 for steering block 210, which is coupled to a path for a specific band and a specific mode of operation for the radio communication device. Each of the steering blocks also has a pair of steering lines, lines 252 and 254 for steering block 204, lines 256 and 258 for steering block 206, lines 260 and 262 for steering block 208, and lines 264 and 266 for steering block 210, coupled to a processor 268 to control the magnitude and path of the amplified differential RF signal by having a differential voltage applied. Only one steering block having a path corresponding to a desired RF mode and band is enabled at a time by having a differential voltage, corresponding to a desired RF signal output level, applied to its steering lines while the steering lines of the other steering blocks are grounded thereby disabling them. By duplicating only the steering block portion, the present invention accomplishes multi-mode and multi-band capability without significantly increasing the size, current consumption, or external supporting components.

The following describes an exemplary operation of a radiotelephone, which is capable of operating in code-division-multiple-access (CDMA) systems in 800 MHz and 1900 MHz bands and global system for mobile (GSM) in 900 MHz and 1800 MHz bands, employing the present invention operating in the 1900 MHz CDMA system.

Each steering block is coupled to a path for a specific mode and band: the steering block 204 for the 800 MHz CDMA, the steering block 206 for the 1900 MHz CDMA, the steering block 208 for the 900 MHz GSM, and the steering block 210 for the 1900 MHz GSM.

The radiotelephone first examines what mode and band of operation is appropriate, and determines the appropriate mode and band of operation to be the 1900 MHz CDMA. The radiotelephone then disables the steering blocks 204, 208, and 210, corresponding to 800 MHz CDMA, 900 MHz GSM, and 1900 MHz GSM, respectively, by grounding the steering lines of these steering blocks, lines 252 and 254 for steering block 204, lines 260 and 262 for steering block 208, and lines 264 and 266 for steering block 210. A differential voltage, corresponding to a desired power level for a RF output signal, is applied to the steering lines 256 and 258 of the steering block 206 enabling the steering block 206 thereby fixing the path for a RF signal from the differential amplifier 202.

The present invention focuses on a radiotelephone capable of being operated in multiple different systems, however, it may be used in other areas utilizing narrow or wide band system, but not limited to, a telecommunication transmission system such as a two-way pager, radiotelephone, high speed modem such as cable modem and LAN, and a cable transmission as cable TV application.

While the preferred embodiment of the invention has been illustrated and described, it is to be understood that the invention is not so limited. Numerous modifications, changes, variations, substitutions and equivalents will occur to those skilled in the art without departing from the broad scope of the present invention as defined by the appended claims.

What is claimed is:

1. An apparatus for controlling an output level and a path of a radio frequency (RF) signal comprising:
    a differential RF amplifier; and
    a plurality of steering blocks coupled to the RF amplifier to receive an amplified RF signal,
    wherein each steering block has two steering lines to control the magnitude and path of the amplified RF signal by having a differential voltage applied.

2. An apparatus of claim 1 wherein the differential amplifier has a first pair of inputs to receive the RF signal and a first pair of outputs coupled to all of the plurality of the steering blocks.

3. An apparatus of claim 1 wherein each of the plurality of the steering block has a pair of inputs to receive the amplified RF signal from the differential RF amplifier and a pair of outputs coupled to a path dedicated to a specific RF band and a specific RF mode.

4. An apparatus of claim 1 wherein only one of the plurality of steering blocks is activated at a time by having a differential voltage applied to its steering lines while the steering lines of the other steering blocks are grounded.

5. An apparatus of claim 4 wherein a selection of a steering block to be activated is based upon the specific RF band and the specific RF mode of a system in which the apparatus is to be operated.

6. An apparatus for controlling an output level and a path of a radio frequency (RF) signal comprising:
    a differential RF amplifier having a first pair of inputs to receive the RF signal and a first pair of outputs; and
    a plurality of steering blocks, each of the plurality of the steering block having a pair of inputs coupled to the first pair of outputs of the differential RF amplifier to receive an amplified RF signal and a pair of outputs coupled to a path dedicated to a specific RF band and a specific RF mode, each of the steering blocks having two steering lines to control the magnitude and path of the amplified RF signal by having a differential voltage applied,
    wherein only one of the plurality of steering blocks is activated at a time by having a differential voltage applied to its steering lines while the steering lines of the other steering blocks are grounded, and a selection of a steering block to be activated is based upon the specific RF band and the specific RF mode of a system in which the apparatus is to be operated.

7. A radiotelephone comprising:
    a receiver; and
    a transmitter,
    wherein the transmitter comprises:
        a differential RF amplifier having a first pair of inputs to receive the RF signal and a first pair of outputs; and
        a plurality of steering blocks, each of the plurality of the steering block having a pair of inputs coupled to the first pair of outputs of the differential RF amplifier to receive an amplified RF signal and a pair of outputs coupled to a path dedicated to a specific RF band and a specific RF mode, each of the steering blocks having two steering lines to control the magnitude and path of the amplified RF signal by having a differential voltage applied,
        wherein only one of the plurality of steering blocks is activated at a time by having a differential voltage applied to its steering lines while the steering lines of the other steering blocks are grounded, and a selection of a steering block to be activated is based upon the specific RF band and the specific RF mode of a system in which the apparatus is to be operated.

8. A method for controlling an output level and a path of a radio frequency (RF) signal comprising the steps of:
    determining a desired mode and band of operation;
    selecting an appropriate steering block for the desired mode and band out of a plurality of steering blocks;
    directing the RF signal to the appropriate steering block for the desired mode and band; and controlling the output level of the RF signal in the appropriate steering block for the desired mode and band.

9. A method of claim 8:

wherein determining the desired mode and band of operation is based upon a system in which the RF signal is to be transmitted.

10. A method of claim 8:

wherein selecting the appropriate steering block for the desired mode and band, and directing the RF signal to the appropriate steering block are achieved by disabling all of the plurality of the steering blocks except for the appropriate steering block.

11. A method of claim 8:

wherein controlling the output level of the RF signal in the appropriate steering block for the desired mode and band is achieved by varying a differential voltage applied to the appropriate steering block.

* * * * *